United States Patent
Sun et al.

(10) Patent No.: US 8,441,756 B1
(45) Date of Patent: May 14, 2013

(54) METHOD AND SYSTEM FOR PROVIDING AN ANTIFERROMAGNETICALLY COUPLED WRITER

(75) Inventors: Ming Sun, Pleasanton, CA (US); Dehua Han, Fremont, CA (US); Jose A. Medina, Pleasanton, CA (US); Ming Jiang, San Jose, CA (US); Ying Hong, Morgan Hill, CA (US); Feng Liu, San Ramon, CA (US); Jian X. Shen, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 4 days.

(21) Appl. No.: 12/970,423

(22) Filed: Dec. 16, 2010

(51) Int. Cl.
*G11B 5/39* (2006.01)

(52) U.S. Cl.
USPC .................................................. 360/125.1

(58) Field of Classification Search ......... 360/125.01
See application file for complete search history.

(56) References Cited

U.S. PATENT DOCUMENTS

| | | | |
|---|---|---|---|
| 5,621,592 A | 4/1997 | Gill et al. | |
| 5,750,275 A | 5/1998 | Katz et al. | |
| 5,838,521 A | 11/1998 | Ravipati | |
| 6,087,027 A | 7/2000 | Hoshiya et al. | |
| 6,233,116 B1* | 5/2001 | Chen et al. | 360/125.5 |
| 6,259,583 B1 | 7/2001 | Fontana, Jr. et al. | |
| 6,292,334 B1 | 9/2001 | Koike et al. | |
| 6,358,635 B1 | 3/2002 | Min et al. | |
| 6,373,667 B1* | 4/2002 | Han et al. | 360/327.22 |
| 6,437,949 B1 | 8/2002 | Macken et al. | |
| 6,456,467 B1 | 9/2002 | Mao et al. | |
| 6,496,335 B2 | 12/2002 | Gill | |
| 6,628,478 B2* | 9/2003 | Gill | 360/125.5 |
| 6,778,358 B1 | 8/2004 | Jiang et al. | |
| 6,791,796 B2 | 9/2004 | Shukh et al. | |
| 6,818,330 B2 | 11/2004 | Shukh et al. | |
| 6,927,952 B2* | 8/2005 | Shimizu et al. | 360/324.12 |
| 6,967,823 B2 | 11/2005 | Nakamoto et al. | |
| 6,980,403 B2 | 12/2005 | Hasegawa | |
| 7,046,487 B2 | 5/2006 | Terunuma | |
| 7,057,853 B2* | 6/2006 | Okada et al. | 360/125.12 |
| 7,170,723 B2 | 1/2007 | Taguchi | |
| 7,180,712 B1 | 2/2007 | Li et al. | |
| 7,295,401 B2 | 11/2007 | Jayasekara et al. | |
| 7,382,574 B2* | 6/2008 | Li et al. | 360/125.08 |
| 7,426,091 B2* | 9/2008 | Okada et al. | 360/125.03 |
| 7,446,979 B2 | 11/2008 | Jayasekara | |
| 7,457,080 B2 | 11/2008 | Watabe et al. | |
| 7,551,394 B2 | 6/2009 | Sasaki et al. | |
| 7,554,765 B2* | 6/2009 | Shukh et al. | 360/125.12 |
| 7,606,007 B2 | 10/2009 | Gill | |
| 7,773,341 B2 | 8/2010 | Zhang et al. | |
| 7,911,737 B1* | 3/2011 | Jiang et al. | 360/125.12 |
| 2002/0149886 A1* | 10/2002 | Gill | 360/317 |

(Continued)

*Primary Examiner* — Mark Blouin (57) ABSTRACT

A method and system for fabricating a magnetic transducer are described. The magnetic transducer includes a pole and a nonmagnetic intermediate layer adjacent to the pole. The pole has a paddle and a pole tip including a plurality of sidewalls. The pole includes a first magnetic pole layer, at least one antiferromagnetic coupling (AFC) structure on the first magnetic pole layer, and a second magnetic pole layer on the AFC structure(s). At least a portion of the first magnetic pole layer resides on the sidewalls of the pole tip. The paddle has a paddle width in a track width direction. The pole tip has a pole tip width in a track width direction that is less than the paddle width.

10 Claims, 11 Drawing Sheets

U.S. PATENT DOCUMENTS

| | | |
|---|---|---|
| 2004/0120074 A1* | 6/2004 | Okada et al. ................ 360/126 |
| 2005/0013044 A1 | 1/2005 | Hirata et al. |
| 2006/0109592 A1 | 5/2006 | Watanabe et al. |
| 2006/0119981 A1 | 6/2006 | Li et al. |
| 2007/0019341 A1* | 1/2007 | Mizuno et al. ........... 360/324.11 |
| 2008/0013221 A1 | 1/2008 | Ohta et al. |
| 2009/0052092 A1 | 2/2009 | Zhou et al. |
| 2009/0279213 A1 | 11/2009 | Wu et al. |
| 2010/0079917 A1 | 4/2010 | Miyauchi et al. |
| 2012/0087046 A1 | 4/2012 | Yanagisawa et al. |
| 2012/0134057 A1 | 5/2012 | Song et al. |

* cited by examiner

Plan View
FIG. 11

Plan View
FIG. 12

Plan View
FIG. 13

Plan View
FIG. 14

Plan View
FIG. 15

METHOD AND SYSTEM FOR PROVIDING AN ANTIFERROMAGNETICALLY COUPLED WRITER

BACKGROUND

Figure 1:
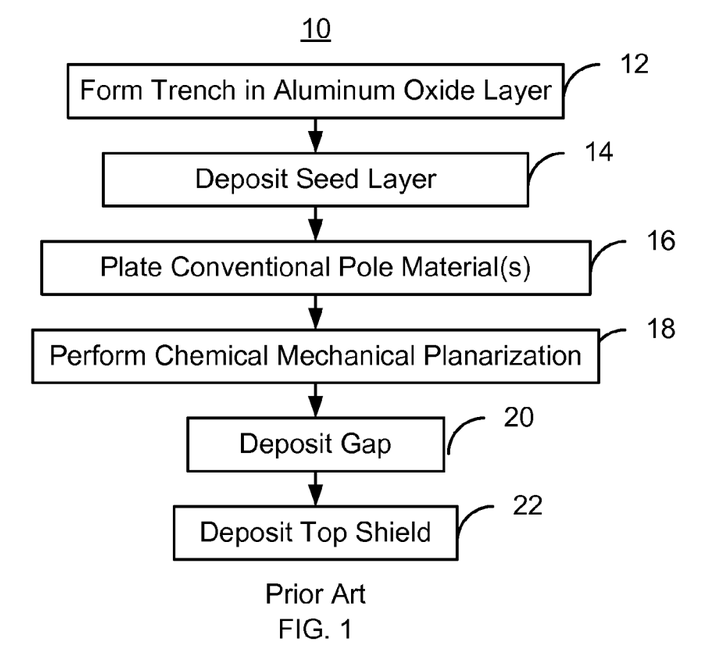
FIG. 1 is a flow chart depicting a conventional method for fabricating a write transducer.

FIG. 1 is a flow chart depicting a conventional method 10 for fabricating a conventional magnetic recording write transducer. For simplicity, some steps are omitted. The conventional method 10 is used for providing a magnetic write pole in an aluminum oxide layer. A trench is formed in the aluminum oxide layer, via step 12. The top of the trench is wider than the trench bottom in the region close to the ABS. As a result, the pole tip formed therein will have its top surface wider than its bottom. A seed layer is deposited, via step 14. The seed layer may be ferromagnetic or nonmagnetic. The conventional pole materials are plated, via step 16. Step 16 may include plating ferromagnetic pole materials. A chemical mechanical planarization (CMP) is then performed, via step 18. The write gap and top shield may then be deposited, via steps 20 and 22, respectively.

Figure 2:
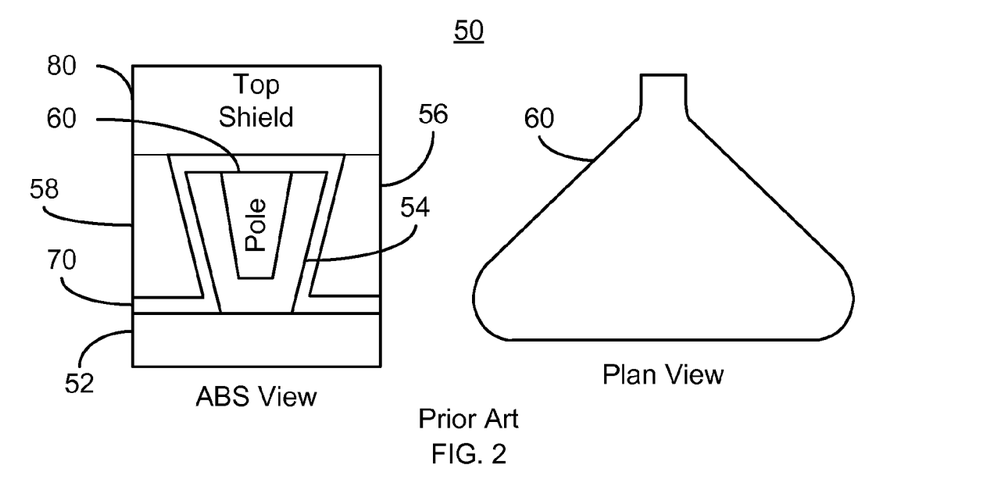
FIG. 2 is a diagram depicting plan and ABS views of a conventional write transducer.

FIG. 2 depicts air-bearing surface (ABS) and plan views of a portion of a conventional transducer 50 formed using the conventional method 10. The conventional transducer 50 includes an underlayer 52, seed layer 54 which is deposited in the trench (not shown). The side material(s) 56 and 58 are also shown. The side material(s) 56 and 58 may be insulating, conductive, ferromagnetic and/or nonmagnetic. The pole 60, write gap 70 and top shield 80 are also shown. Thus, using the conventional method 10, the pole 60 may be formed.

Although the conventional method 10 may provide the conventional transducer 50, there may be drawbacks. The conventional pole 60 is typically formed of plated FeCo or CoFeZ, where Z is a material such as Ni, Rh, Cr, or Ru. The practical upper limit of the moment for such plated materials is approximately 2.4 T with a lower coercivity. In general, the anisotropy field for such materials is low, on the order of ten through thirty-five Oersted. As a result, such conventional poles 50 are likely to suffer from issues such as adjacent track interference (ATI), wide area track erasure (WATE), and domain lock-up (DLU). Accordingly, what is needed is an improved method for fabricating a transducer.

SUMMARY

A method and system for fabricating a magnetic transducer are described. The magnetic transducer includes a pole and a nonmagnetic intermediate layer adjacent to the pole. The pole has a paddle and a pole tip including a plurality of sidewalls. The pole includes a first magnetic pole layer, at least one antiferromagnetic coupling (AFC) structure on the first magnetic pole layer, and a second magnetic pole layer on the AFC structure(s). At least a portion of the first magnetic pole layer resides on the sidewalls of the pole tip. The paddle has a paddle width in a track width direction. The pole tip has a pole tip width in a track width direction that is less than the paddle width.

DETAILED DESCRIPTION OF THE PREFERRED EMBODIMENTS

Figure 3:
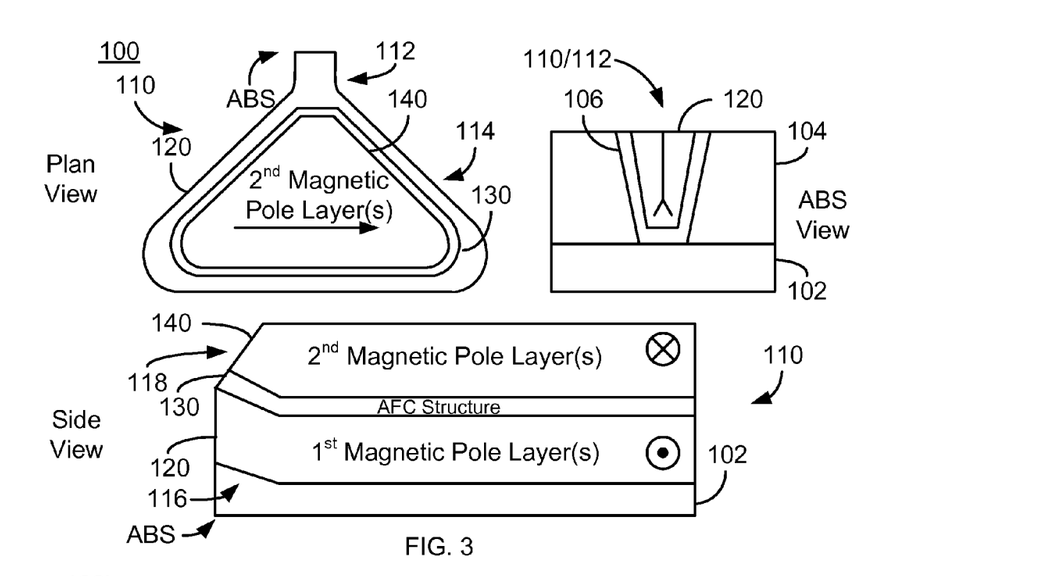
FIG. 3 is a diagram depicting an exemplary embodiment of a portion of a write transducer.

FIG. 3 is a diagram depicting an exemplary embodiment of a portion of a write transducer 100. For clarity, FIG. 3 is not to scale. FIG. 3 depicts plan, ABS, and side views of the transducer 100. The transducer 100 shown includes underlayer 102 and intermediate layer 104. The intermediate layer 104 may be removed later in processing the transducer 100. The magnetic transducer 100 also includes pole 110 residing on optional seed layer 106. In the embodiment shown, the pole 110 includes pole tip portion 112, paddle portion 114, and bevels 116 and 118. However, in other embodiments, leading edge bevel 118 and/or trailing edge bevel 116 may be omitted. As can be seen in the plan view, the pole tip portion 112 has a width in the track width direction that is less than width of the paddle portion 114.

The pole 110 includes magnetic pole layers 120 and 140 separated by antiferromagnetic coupling (AFC) structure 130. The magnetic pole layers 120 and 140 may have a high saturation magnetization and thus may include at least one of Co, Ni, and Fe. In some embodiments, the magnetic pole layers 120 and 140 may have a low anisotropy, for example not over 50 Oe. In some such embodiments, the anisotropy field is in the range of 10-35 Oe. A low coercivity may also be desired. In some embodiments, the materials used for the magnetic layers 120 and 140 are the same. However, in other embodiments, the materials used for the layers 120 and 140 may be different. In some embodiments, the ferromagnetic layers 120 and 140 may be plated. However, in other embodiments, other deposition techniques may be used. Further, the layers 120 and 140 may include sublayers. Because of the presence of AFC structure 130, the layers 120 and 140 are antiferromagnetically coupled. This can be seen in the side and plan views of FIG. 3. In some embodiments, more than two high moment layers 120 and 140 and more than one AFC structure 130 may be used. For example, two AFC structures may be interleaved with three magnetic pole layers. However, fewer AFC structure(s) 130 are generally desired so as to not dilute the moment of the pole 110. The AFC structure 130 may be used to increase the anisotropy of the layers 120 and 140. In addition, the seed layer 106 may be configured to increase the anisotropy or otherwise tailor the properties of the magnetic layers 120 and 140. In the embodiment shown, the magnetic layers 120 and 140 have substantially the same thickness. Thus, the AFC structure 130 resides in the middle of the pole 110. However, in other embodiments, the magnetic layers 120 and 140 may have different thicknesses. For example, the top magnetic layer 140 may be thinner or thicker than the bottom magnetic pole layer 120.

AFC structure 130 is used to ensure that the layers 120 and 140 are antiferromagnetically coupled. In some embodiments, the AFC structure 130 may be a simple nonmagnetic layer, such as a Ru, NiCr, or Cr layer. In some embodiments, the Ru layer is on the order of 4-10 Angstroms. In some such embodiments, the Ru layer may be 8-9 Angstroms thick. Further, other materials such as Cu and alumina may also be used as the AFC structure 130. In other embodiments, the AFC structure 130 may be a multilayer. For example, the AFC structure may include two layers of ferromagnetic material sandwiching a thin layer of nonmagnetic material. The ferromagnetic material may include materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. The nonmagnetic layer may include materials such as Ru, NiCr, and/or Cr. In other embodiments, the AFC structure 130 may include more ferromagnetic layers interleaved with nonmagnetic material(s). In general, a thinner AFC structure 130 having fewer layers is desired so as to not dilute the moment of the pole 110. By judicious selection of the materials for the ferromagnetic layers of the AFC structure 130, the AFC structure 130 may be used to increase the anisotropy of the pole 110. For example, the CoFe/Ru/CoFe multilayer described above may have an anisotropy field on the order of two thousand Oe or more. Further, the AFC structure 130 may be sputtered. In other embodiments, some or all of the AFC structure may be fabricated using other deposition technique(s).

As discussed above, the pole tip portion 112 of the pole 110 is thinner in the track width direction (left-right in the plan view) than the paddle 114. In addition, a sufficient thickness of the first magnetic pole layer 120 is provided such that the pole tip region 112 is filled by the first magnetic pole layer 120. For example, in some embodiments, the pole width in the pole tip region 110 is less than half of the paddle thickness. In addition, deposition of the first magnetic pole layer 120 may be conformal. Such a deposition also fills the pole tip region 112 from the sides as well as the bottom. As a result, the pole tip region 112 may be filled when the paddle region 114 is less than half full. In such an embodiment, a first magnetic layer 120 having a thickness of approximately half of the paddle thickness fills the pole tip region 112. Such an embodiment is depicted in FIG. 3. As is also shown in FIG. 3, in such an embodiment, the AFC structure 130 and second magnetic pole layer 140 do not reside at the ABS or in the pole tip region 112. However, layers 120, 130, and 140 all reside in the paddle 114 of the pole 110.

The pole 110 and thus the transducer 100 may have improved performance. When the pole 110 is energized, for example by write coils (not shown in FIG. 3), the narrow pole tip region 110 may be fully saturated. Further, as a high saturation magnetization material(s) of the layer 120 fill the pole, this saturation magnetization may be high. In contrast, in much of the flat region of the paddle 114 a strong antiferromagnetic coupling in the plane of the layers may be achieved. These regions may thus have a higher anisotropy, a lower coercivity and a lower saturation magnetization. Consequently, the paddle region 114 may not fully saturate. Further, when the pole 110 is not energized, the antiferromagnetic coupling between the layers 120 and 140 may dominate. Thus, the layers 120 and 140 may be antiferromagnetically coupled and have their magnetizations as shown, substantially parallel to the ABS. As a result, there may be less stray field, reduced side track erasure, reduced ATI, reduced WATE, and reduced DLU. Further, the thicknesses and materials used for the layers 120, 130, and 140 may be tailored in order to optimize various aspects of performance. Consequently, performance of the transducer 100 may be improved.

Figure 4:
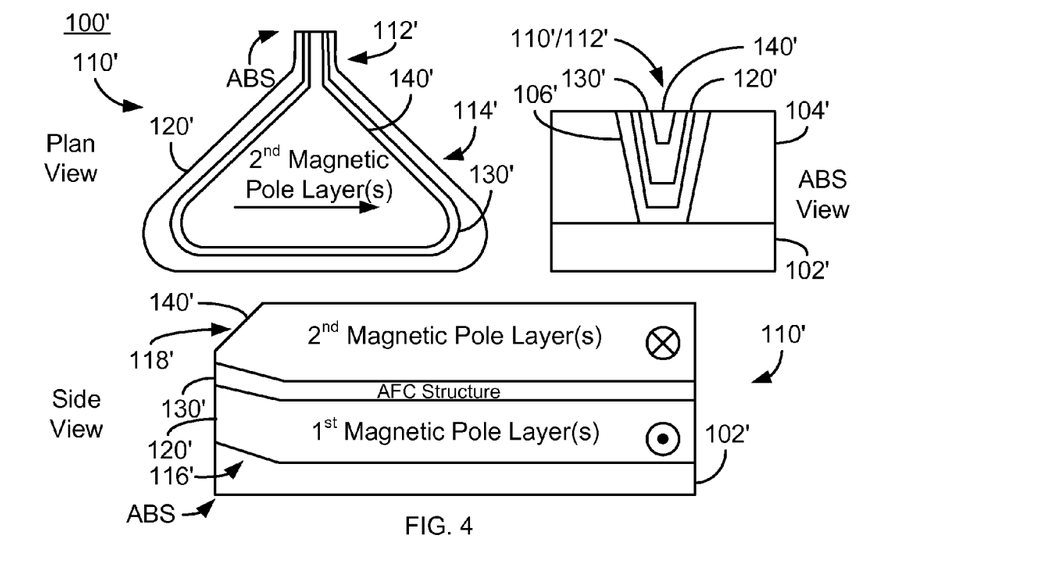
FIG. 4 is a diagram depicting another exemplary embodiment of a portion of a write transducer.

FIG. 4 depicts another exemplary embodiment of a portion of a write transducer 100'. For clarity, FIG. 4 is not to scale. FIG. 4 depicts plan, ABS, and side views of the transducer 100'. The transducer 100' is analogous to the transducer 100. Consequently, the transducer 100' shown includes underlayer 102', intermediate layer 104', optional seed layer 106', and pole 110' including pole tip portion 112', paddle portion 114', and optional bevels 116' and 118' corresponding to underlayer 102, intermediate layer 104, optional seed layer 106, and pole 110 including pole tip portion 112, paddle portion 114, and bevels 116 and 118, respectively. Further, pole 110' includes layer 120', AFC structure 130', and layer 140' corresponding to the layer 120, AFC structure 130, and layer 140, respectively. The function, materials, and structure of the components 102', 104', 106', 110', 112', 114', 116', 118', 120', 130', and 140' are thus analogous to the components 102, 104, 106, 110, 112, 114, 116, 118, 120, 130, and 140, respectively. Thus, the pole 110' and magnetic write transducer 100' may share the benefits of the pole 110 and magnetic write transducer 100, respectively.

Figure 5:
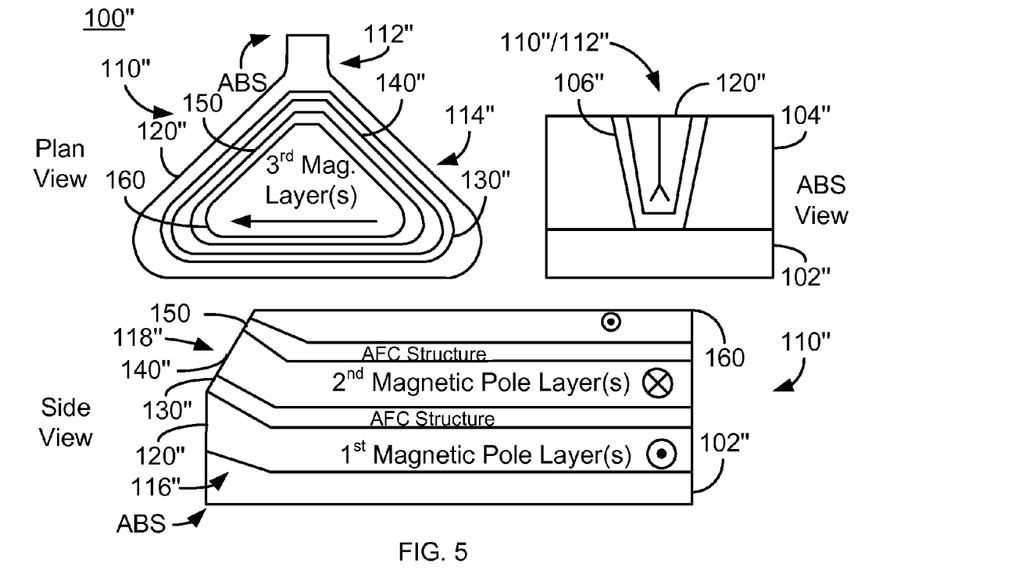
FIG. 5 is a diagram depicting another exemplary embodiment of a portion of a write transducer.

In addition, for the pole 110' depicted in FIG. 4, a portion of the AFC structure 130' and second magnetic pole layer 140' resides in the pole tip 112'. Thus, portions of the pole tip 112' may also be antiferromagnetically coupled. FIG. 5 depicts another exemplary embodiment of a portion of a write transducer 100". For clarity, FIG. 5 is not to scale. FIG. 5 depicts plan, ABS, and side views of the transducer 100". The transducer 100" is analogous to the transducer 100. Consequently, the transducer 100" shown includes underlayer 102", intermediate layer 104", optional seed layer 106", and pole 110" including pole tip portion 112", paddle portion 114", and optional bevels 116" and 118" corresponding to underlayer 102, intermediate layer 104, optional seed layer 106, and pole 110 including pole tip portion 112, paddle portion 114, and bevels 116 and 118, respectively. Further, pole 110" includes layer 120", AFC structure 130", and layer 140" corresponding to the layer 120, AFC structure 130, and layer 140, respectively. The function, materials, and structure of the components 102", 104", 106", 110", 112", 114", 116", 118", 120", 130", and 140" are thus analogous to the components 102, 104, 106, 110, 112, 114, 116, 118, 120, 130, and 140, respectively.

In addition, the pole 110" also includes an additional AFC structure 150 and magnetic layer(s) 160. The AFC structure 150 is analogous to the AFC structure 130'/130. Thus the AFC structure 150 may include a single nonmagnetic layer or a multilayer. Similarly, the magnetic pole layer 160 may include the same or different materials as the magnetic pole layers 120" and 140". In general, high saturation magnetization, low coercivity materials are desired. In the embodiment shown, the first magnetic pole layer 120" fills the pole tip 112". However, in other embodiments, a portion of one or more of the remaining pole component(s) 130", 140", 150, and 160 may reside in the pole tip 112". The layers 120", 140" and 160 are antiferromagnetically coupled in the paddle 114" due at least in part to the AFC structures 130" and 150. Further, the pole tip 112" may be filled by high saturation magnetization layer 120". Thus, the pole 110" and magnetic write transducer 100" may share the benefits of the pole 110 and magnetic write transducer 100, respectively.

Figure 6:
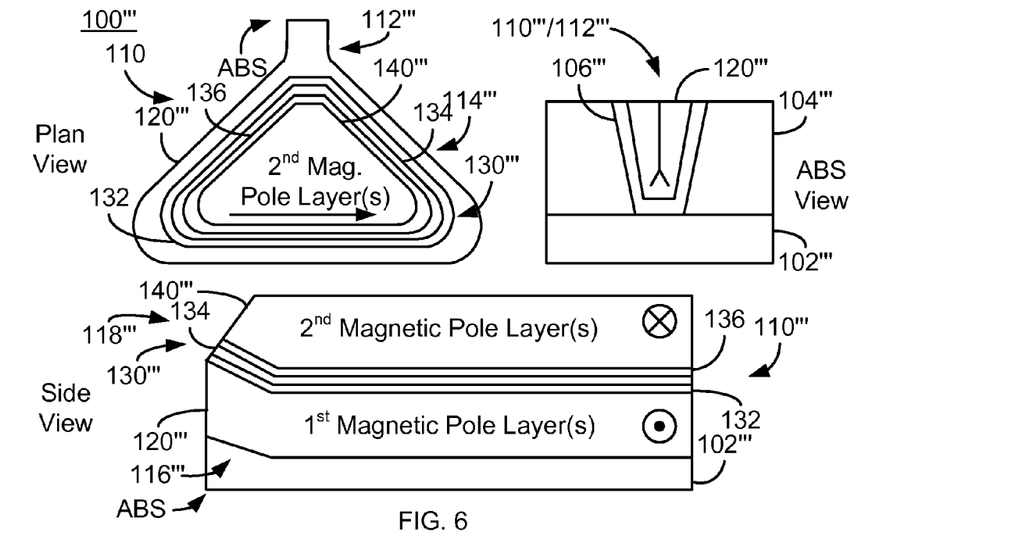
FIG. 6 is a diagram depicting another exemplary embodiment of a portion of a write transducer.

FIG. 6 depicts another exemplary embodiment of a portion of a write transducer 100'''. For clarity, FIG. 6 is not to scale. FIG. 6 depicts plan, ABS, and side views of the transducer 100'''. The transducer 100''' is analogous to the transducers 100, 100', and 100". Consequently, the transducer 100''' includes underlayer 102''', intermediate layer 104''', optional seed layer 106''', and pole 110''' including pole tip portion 112''', paddle portion 114''', and optional bevels 116''' and 118''' corresponding to underlayer 102, intermediate layer 104, optional seed layer 106, and pole 110 including pole tip portion 112, paddle portion 114, and bevels 116 and 118, respectively. Further, pole 110''' includes layer 120''', AFC structure 130''', and layer 140''' corresponding to the layer 120, AFC structure 130, and layer 140, respectively. The function, materials, and structure of the components 102''', 104''', 106''', 110''', 112''', 114''', 116''', 118''', 120''', 130''', and 140''' are thus analogous to the components 102, 104, 106, 110, 112, 114, 116, 118, 120, 130, and 140, respectively. Although not shown, the pole 110''' may also include additional AFC structure(s) (not shown) interleaved with magnetic layer(s) (not shown) in a manner analogous to the pole 110''. Further, although the first magnetic layer 120''' is shown as filling the pole tip 112''', in another embodiment, a portion of one or more of the additional structure(s) 130''' and 140''' could reside in the pole tip 112'''.

In the pole 110''', the AFC structure 130''' is explicitly shown as including a multilayer. In the embodiment shown, ferromagnetic layers 132 and 136 sandwich a nonmagnetic layer 134. In some embodiments, the ferromagnetic layers 132 and 136 have a high anisotropy. For example, the ferromagnetic materials used for layers 132 and 136 may include materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. In some embodiments, the layers 132 and 136 are composed of the same materials. However, in other embodiments, the layers 132 and 136 may differ. Further, although shown as having substantially the same thickness, the layers 132 and 136 may have different thicknesses in other embodiments. The nonmagnetic layer 134 may include materials such as Ru, NiCr, and/or Cr. The nonmagnetic layer 134 is generally desired to be thin to support an antiferromagnetic coupling between the layers 132 and 136. For example, in some embodiments, the layer 132 is a Ru layer is on the order of 4-10 Angstroms thick. In some such embodiments, the Ru layer may be 8-9 Angstroms thick. However, in other embodiments, other materials and other thicknesses may be used.

Thus, the pole 110''' also includes analogous structures to the poles 110, 110', and 110''. As a result, the pole 110''' and magnetic transducer 100''' may share the benefits of the magnetic pole(s) 110/110'/110'' and magnetic transducer(s) 100/100'/100''.

Figure 7:
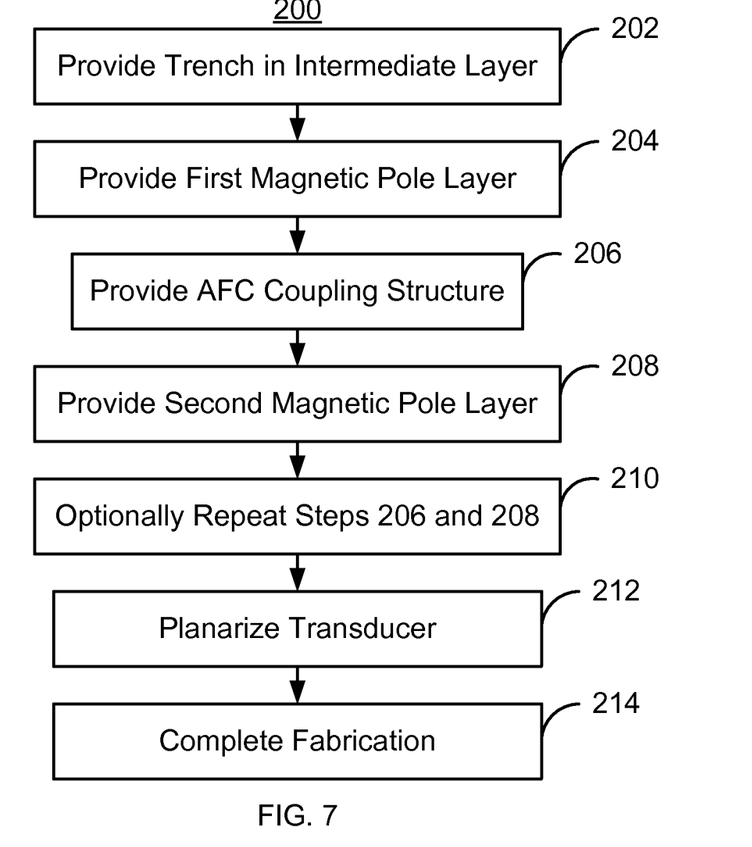
FIG. 7 is a flow chart depicting an exemplary embodiment of a method for fabricating a write transducer.

FIG. 7 is a flow chart depicting an exemplary embodiment of a method 200 for fabricating a transducer, such as the magnetic transducer 100, 100', 100'', and/or 100'''. For clarity, the method 200 is described in the context of the magnetic transducer 100. For simplicity, some steps may be omitted and/or combined. The transducer being fabricated may be part of a merged head that also includes a read head (not shown) and resides on a slider (not shown) in a disk drive. The method 200 also may commence after formation of other portions of the transducer. The method 200 is also described in the context of providing a single pole and its associated structures in a single magnetic recording transducer 100. However, the method 200 may be used to fabricate multiple transducers at substantially the same time. The method 200 and system are also described in the context of particular layers. However, in some embodiments, such layers may include multiple sub-layers. In one embodiment, the method 200 commences after formation of the underlayer(s) 102 on which the pole 110 is to reside as well as a nonmagnetic intermediate layer 104. In some embodiments, the intermediate layer 104 is an aluminum oxide layer. In addition, the underlayer 102 may include an etch stop layer. Further, in some embodiments, a leading edge shield is desired. In such embodiments, the leading edge shield may be provided under the underlayer. The leading edge shield is generally ferromagnetic, magnetically soft, and may include materials such as NiFe.

A trench is formed in a portion of the intermediate layer, via step 202. Trench formation may include a reactive ion etch (RIE). The RIE may terminate in the stop layer. Thus, the trench bottom may be formed by a portion of the stop layer. However, in alternate embodiments, the trench may terminate in other layers including but not limited to the intermediate layer and an underlying shield layer. The RIE used in step 202 may be an aluminum oxide RIE. The trench has a profile and a location that correspond to the pole being formed. Thus, the trench may have a top wider than its bottom and is located where the pole is to be formed. Further, the trench has portions corresponding to the pole tip 112 and paddle 114.

The first magnetic pole layer 120 is provided, via step 204. In some embodiments, step 204 may include depositing a conductive seed layer. The seed layer may be magnetic or nonmagnetic. The first magnetic pole layer 120 may be deposited in a number of ways. In some embodiments, the first magnetic pole layer 120 is plated. In addition, step 204 may terminate after the pole tip 112 has been filled.

An AFC structure 130 is provided on the first magnetic pole layer 120, via step 206. In some embodiments, step 206 includes sputtering the AFC structure 130. Sputtering the AFC structure 130 may ensure that the interfaces in the AFC structure are smoother. This may improve the antiferromagnetic coupling desired. However, in other embodiments, other deposition methods such as plating may be used. Step 206 may include depositing a nonmagnetic layer or a multilayer that may include ferromagnetic layers. In some embodiments, the AFC structure provided in step 206 may only reside in the paddle portion once fabrication is completed. However, in other embodiments, the AFC structure provided in step 206 may also reside in the pole tip region.

The second magnetic pole layer 140 is provided, via step 208. The second magnetic pole layer 140 may be deposited in a number of ways. In some embodiments, the second magnetic pole layer 140 is plated.

Step 206-208 may optionally be repeated, via step 210. In such embodiments, the pole 110 provided would have more than the layers depicted in FIG. 3. Referring back to FIG. 7, once the layers for the pole 110 have been provided, the transducer is planarized, via step 212. In some embodiments, step 212 includes performing a chemical mechanical planarization (CMP). Fabrication of the transducer 100 may then be completed, via step 214. For example, bevel 118 may be formed and/or additional structures such as write gaps, shield(s) and coil(s) may be provided.

Using the method 200, pole 110 having the desired geometry and coupling between the layers 120 and 140 may be fabricated. The benefits of the magnetic transducer 100 and pole 110 may be achieved. Performance of the magnetic transducer 100 may thus be enhanced.

Figure 8:
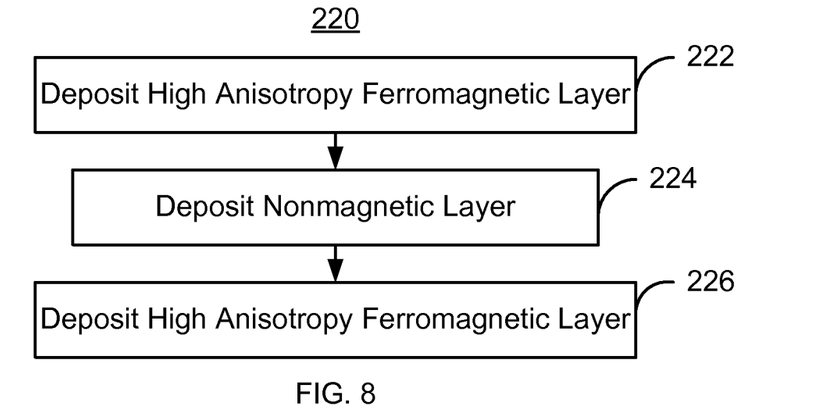
FIG. 8 is a flow chart depicting an exemplary embodiment of a method for fabricating an antiferromagnetic coupling structure.

FIG. 8 is a flow chart depicting an exemplary embodiment of a method 220 for fabricating an AFC structure, such as the AFC structure 130'''. The method 220 may be used in methods for fabricating a pole and/or transducer. For example, the method 220 may be used in the step(s) 206 and/or 210. For clarity, the method 220 is described in the context of the AFC structure 130'''. For simplicity, some steps may be omitted and/or combined. The method 220 is also described in the context of providing a single AFC structure 130'''. However, the method 220 may be used to fabricate multiple AFC structures at substantially the same time. The method 220 and system are also described in the context of particular layers. However, in some embodiments, such layers may include multiple sub-layers.

A high anisotropy ferromagnetic layer 132 is deposited, via step 222. In some embodiments, step 222 occurs after an optional ion mill is performed on the underlying magnetic layer 120'''. Such an ion mill may be performed to preclean the top surface of the magnetic layer 120'''. In some embodiments, step 222 includes sputtering a layer including materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd.

A nonmagnetic layer 134 is deposited to a desired thickness, via step 224. The thickness selected in step 224 is such that the desired magnetic coupling is provided between the layers 132 and 136. In some embodiments, step 224 includes sputtering a Ru layer However, in other embodiments, other processes and/or other materials may be used.

Another high anisotropy ferromagnetic layer 136 is deposited, via step 226. In some embodiments, step 226 includes sputtering a layer including materials such as at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd.

Using the method 220, a high anisotropy AFC coupling structure 130''' may be provided. Thus, the performance of a pole 110''' and magnetic transducer 100''' using such a structure may be enhanced.

Figure 9:
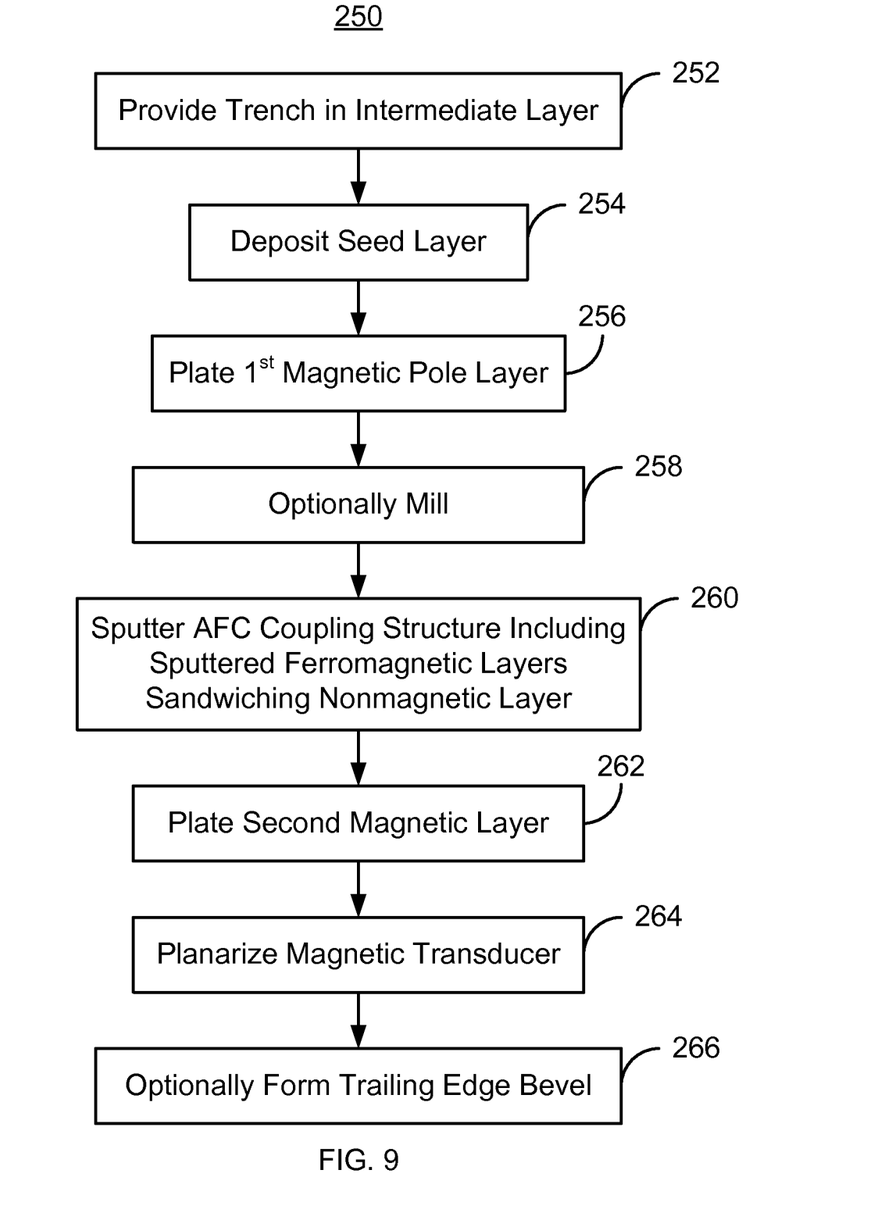
FIG. 9 is a flow chart depicting another exemplary embodiment of a method for fabricating a write transducer.

FIG. 9 is a flow chart depicting another exemplary embodiment of a method 250 for fabricating a magnetic write transducer. For simplicity, some steps may be omitted. FIGS. 10-15 are diagrams depicting side, ABS, and plan views of an exemplary embodiment of a portion of a transducer during 300 fabrication. For clarity, FIGS. 10-15 are not to scale. The side views in FIGS. 10-15 are taken in the middle of the location at which the pole is formed. Further, although FIGS. 10-15 depict the ABS location (location at which the ABS is to be formed) and ABS at a particular point in the pole, other embodiments may have other locations for the ABS. Referring to FIGS. 9-15, the method 250 is described in the context of the transducer 300. However, the method 250 may be used to form another device (not shown). The transducer 300 being fabricated may be part of a merged head that also includes a read head (not shown in FIGS. 10-15) and resides on a slider (not shown) in a disk drive. The method 250 also may commence after formation of other portions of the transducer 300. The method 250 is also described in the context of providing a single transducer 300. However, the method 250 may be used to fabricate multiple transducers at substantially the same time. The method 250 and device 300 are also described in the context of particular layers. However, in some embodiments, such layers may include multiple sublayers.

Figure 10:
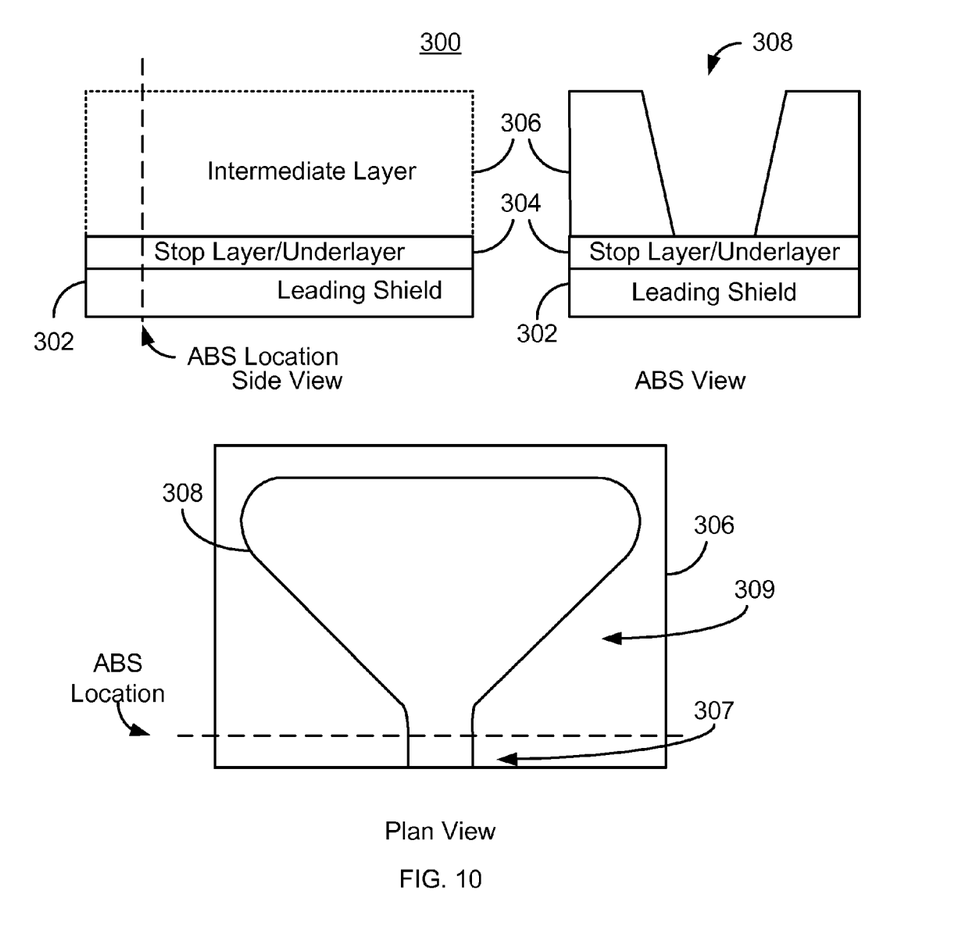
FIGS. 10-15 are diagrams depicting an exemplary embodiment of a magnetic recording transducer during fabrication.

In one embodiment, the method 200 commences after formation of the leading shield 302 and underlayer(s) 304 on which the pole is to reside as well as a nonmagnetic intermediate layer 306. In some embodiments, the intermediate layer 306 is an aluminum oxide layer. In addition, the underlayer 304 may include an etch stop layer. The leading shield 302 is generally ferromagnetic, magnetically soft, and may include materials such as NiFe.

A trench is formed in a portion of the intermediate layer, via step 252. Trench formation may include a RIE that may terminate in the stop layer. Thus, the trench bottom may be formed by a portion of the stop layer. However, in alternate embodiments, the trench may terminate in other layers including but not limited to the intermediate layer and an underlying shield layer. The RIE used in step 252 may be an aluminum oxide RIE. The trench has a profile and a location that correspond to the pole being formed.

FIG. 10 depicts the transducer 300 after step 252 is performed. Thus, a leading shield 302 and stop layer/underlayer 304 are shown. Intermediate layer 306 having trench 308 therein are also shown. The trench 308 has a top wider than its bottom and is located where the pole is to be formed. Further, the trench has a pole tip portion 307 and a paddle portion 309 corresponding to the pole tip and paddle. In the embodiment shown, the trench 308 terminates at the underlayer 304. However, in other embodiments, the trench 308 may terminate in the leading shield 302.

Figure 11:
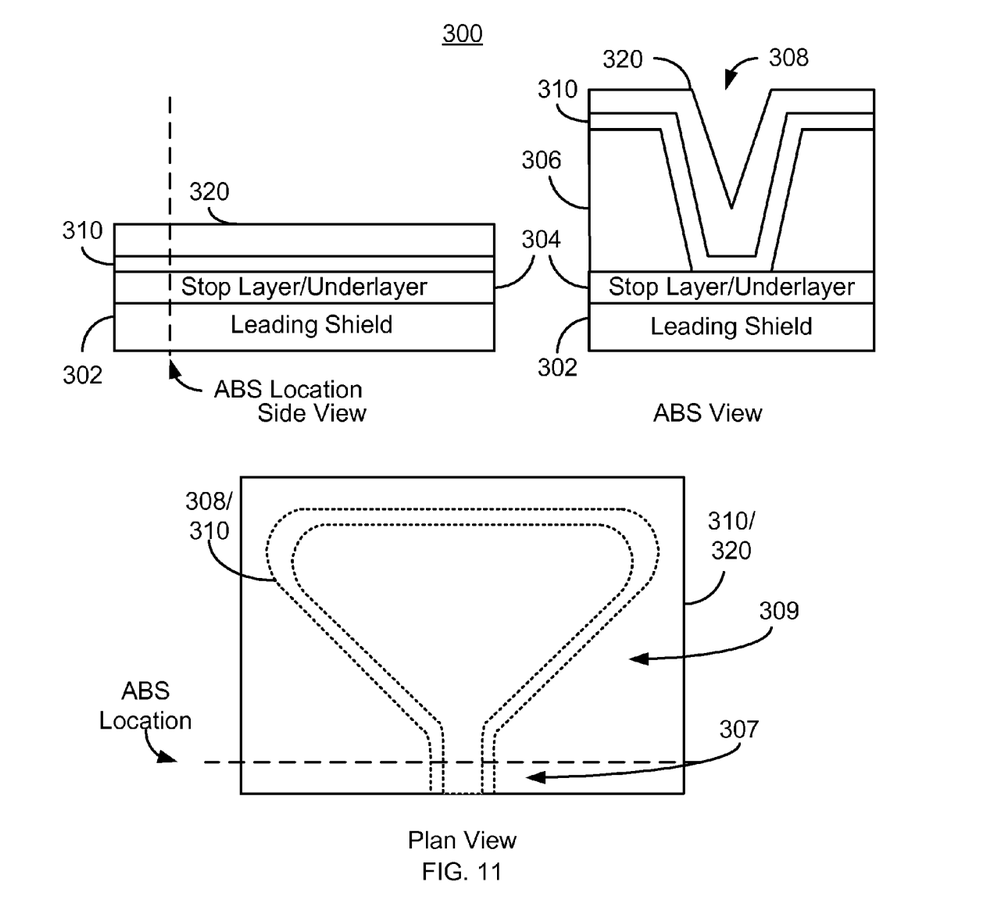
Figure 12:
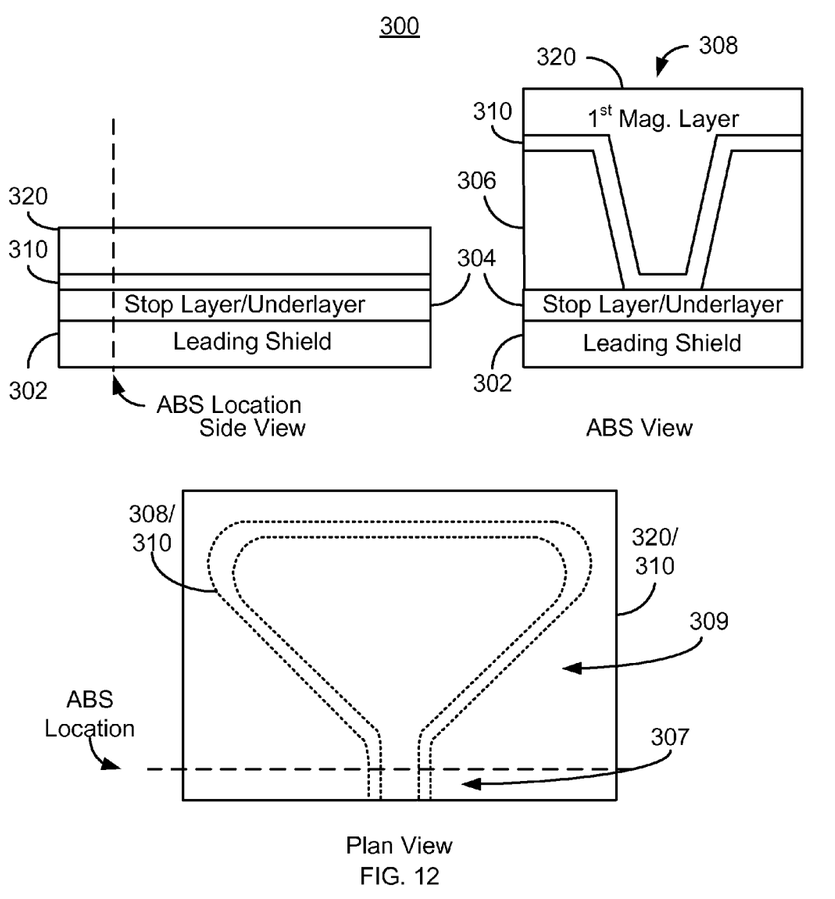
Figure 13:
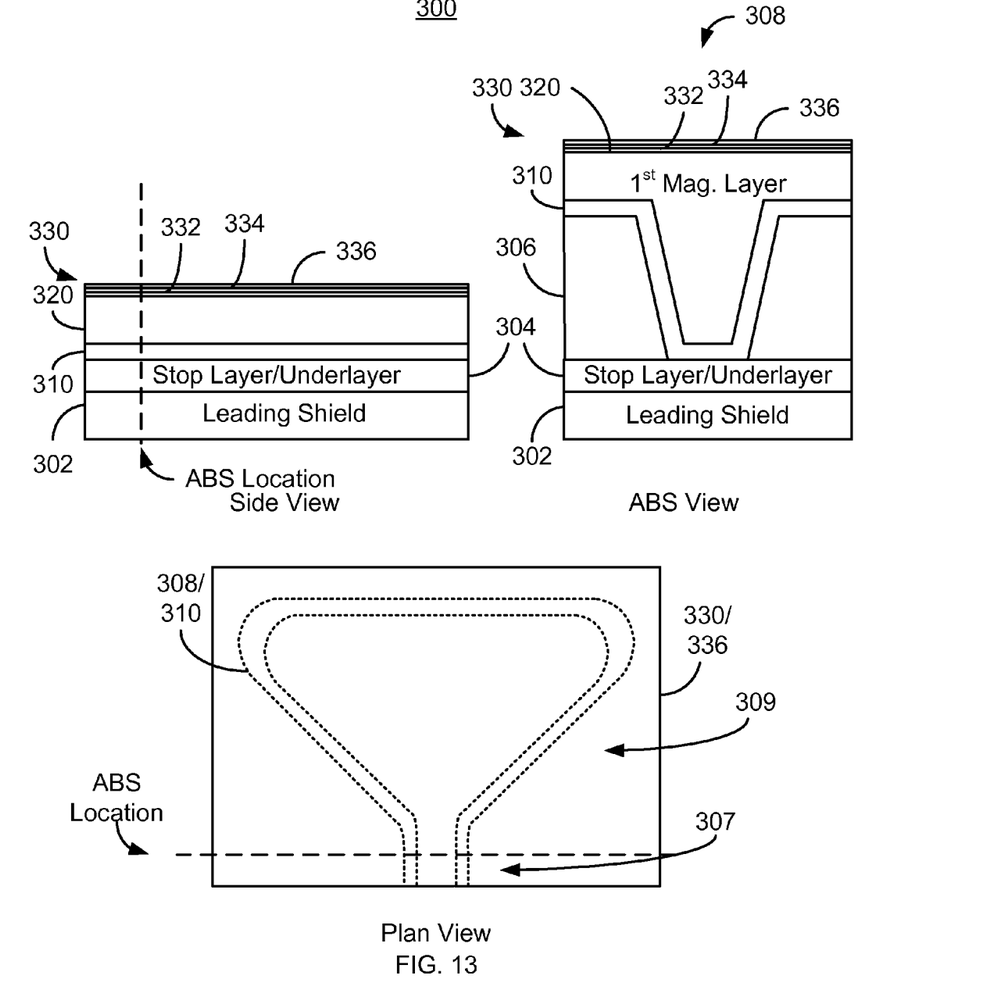

A conductive seed layer is deposited, via step 254. The first magnetic pole layer is plated, via step 256. FIG. 11 depicts the transducer 300 during step 256. Thus, seed layer 310 and a portion of the first magnetic pole layer 320 are shown. As can be seen in the ABS view, the pole tip portion 307 of the trench proximate to the ABS location fills faster than the paddle portion 309 distal from the ABS. FIG. 12 depicts the transducer 300 after step 256 is completed. Step 256 has been terminated after the pole tip portion 307 of the trench 308 has been filled. Thus, the first magnetic layer 320 has been provided. In the embodiment shown, no leading edge bevel is formed. However, in another embodiment, a leading edge bevel is provided, for example by shaping the trench 308. The first magnetic layer 320 is optionally milled or otherwise precleaned, via step 258. An AFC structure is sputtered on the first magnetic pole layer 320, via step 260. In some embodiments, step 260 includes sputtering high anisotropy magnetic layers sandwiching a nonmagnetic conductive layer. FIG. 13 depicts the transducer 300 after step 260 is performed. Thus, AFC structure 330 including layers 332, 334, and 336 has been formed. The laser 332 and 336 are ferromagnetic layers that may have a high anisotropy. Thus, layers 332 and 336 may include at least one of $Co_{1-x}Fe_x$ and $Co_{1-x-y}Z_yFe_x$, where x is at least 0.55 and not more than 0.75, y is less than or equal to 0.05, and Z is at least one of Ni, Cu, Cr, Mo, B, Pt, P, Rh and Pd. Layer 334 is a conductive, nonmagnetic layer such as Ru.

Figure 14:
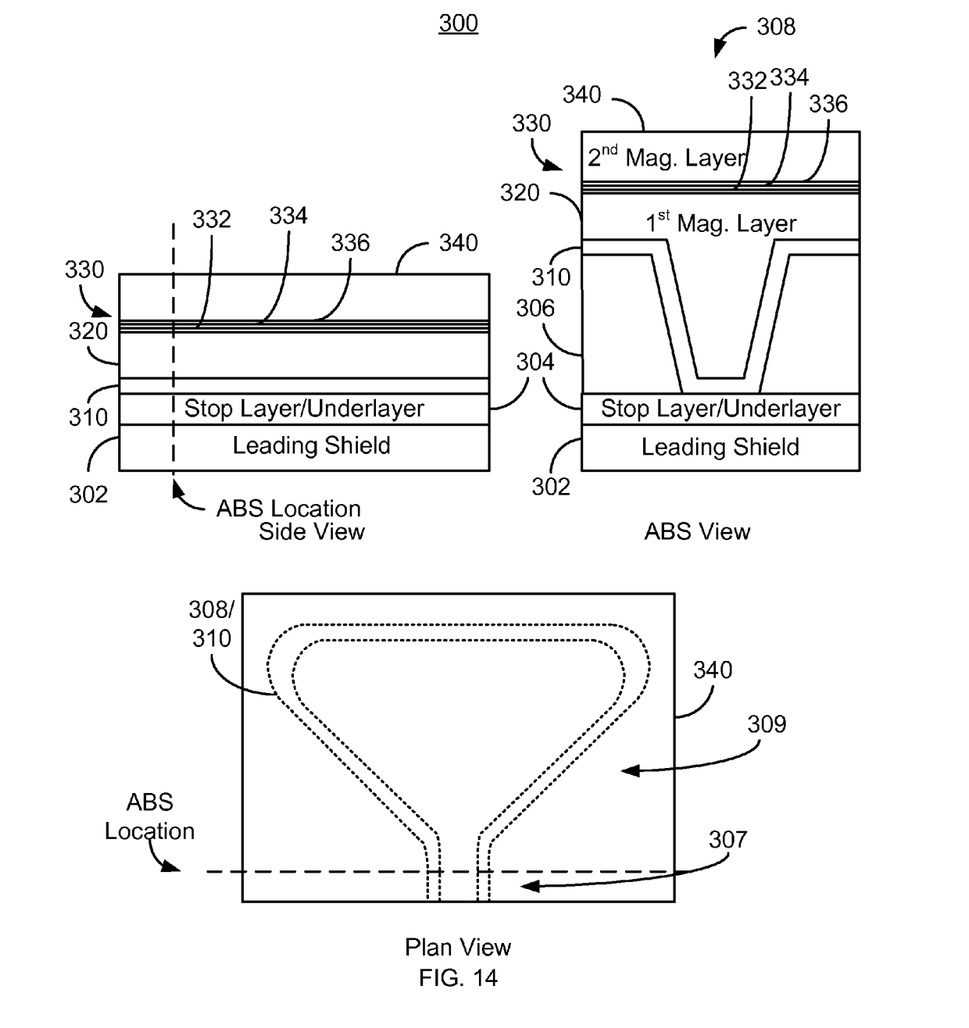
Figure 15:
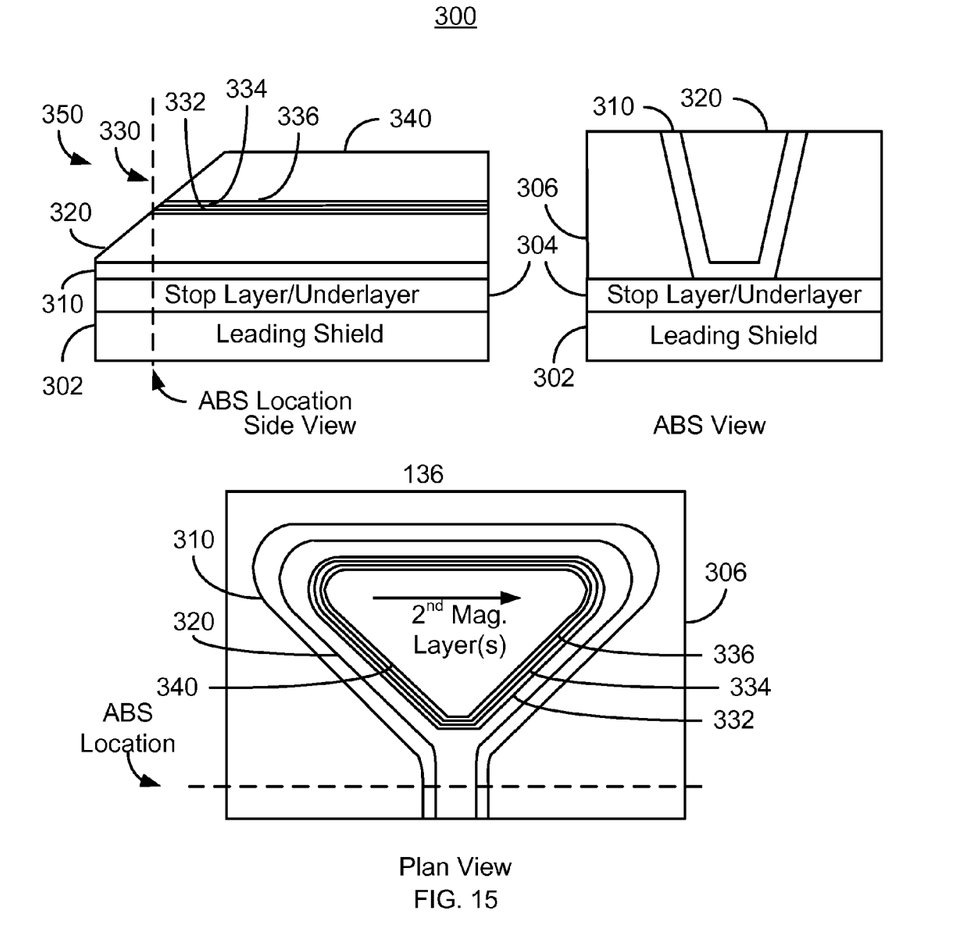

The second magnetic pole layer is plated, via step 262. FIG. 14 depicts the transducer 300 after step 262 is performed. Thus, a second magnetic layer 340 is shown. The transducer is planarized, via step 264. In some embodiments, step 264 includes performing a CMP. A trailing edge bevel may be formed, via step 266. FIG. 15 depicts the transducer 300 after step 266 is performed. Thus, bevel 350 is shown. Fabrication of the transducer 300 may then be completed.

Using the method 250, the magnetic transducer 300 analogous to the transducers 100, 100', 100", and 100''' may be formed. The benefits of the magnetic transducers 100, 100', 100", and 100''' may be achieved. Performance of the magnetic transducer 300 may thus be enhanced.

We claim:

1. A magnetic write transducer comprising:
   a pole having a paddle and a pole tip including a plurality of sidewalls, the pole including a first magnetic pole layer, at least one antiferromagnetic coupling (AFC) structure on the first magnetic pole layer, and a second magnetic pole layer on the at least one AFC structure, at least a portion of the first magnetic pole layer residing on the sidewalls of the pole tip, the paddle having a paddle width in a track width direction, pole tip having a pole tip width in a track width direction that is less than the paddle width, the at least one AFC structure residing only in the paddle of the pole, the first magnetic pole layer substantially filling the pole tip such that the pole tip is ferromagnetic;

a nonmagnetic intermediate layer adjacent to the pole.

2. The magnetic transducer of claim 1 wherein each of the at least one AFC structure further includes:

a nonmagnetic layer.

3. The magnetic transducer of claim 2 wherein each of the at least one AFC structure further includes:

a first ferromagnetic layer; and a second ferromagnetic layer, the nonmagnetic layer residing between the first ferromagnetic layer and the second ferromagnetic layer.

4. The magnetic transducer of claim 2 wherein the nonmagnetic layer includes at least one of Ru, NiCr, and Cr.

5. The magnetic transducer of claim 1 wherein the at least one AFC structure resides only in the paddle of the pole and wherein the first magnetic pole layer substantially fills the pole tip.

6. The magnetic transducer of claim 1 wherein the first magnetic pole layer has a first thickness and a second magnetic pole layer has a second thickness less than the first thickness.

7. The magnetic transducer of claim 1 wherein the first magnetic pole layer has a first thickness and a second magnetic pole layer has a second thickness greater than the first thickness.

8. The magnetic transducer of claim 1 wherein the first magnetic pole layer has a first thickness and a second magnetic pole layer has a second thickness substantially equal to the first thickness.

9. The magnetic transducer of claim 1 wherein a portion of the at least one AFC structure resides in the pole tip.

10. A disk drive comprising:

a media; and at least one slider including at least one magnetic write transducer, the magnetic write transducer including a pole and a nonmagnetic intermediate layer adjacent to the pole, the pole having a paddle and a pole tip including a plurality of sidewalls, the pole including a first magnetic pole layer, at least one antiferromagnetic coupling (AFC) structure on the first magnetic pole layer, and a second magnetic pole layer on the at least one AFC structure, at least a portion of the first magnetic pole layer residing on the sidewalls of the pole tip, the paddle having a paddle width in a track width direction, pole tip having a pole tip width in a track width direction that is less than the paddle width, the at least one AFC structure residing only in the paddle of the pole, the first magnetic pole layer substantially filling the pole tip such that the pole tip is ferromagnetic.

* * * * *